United States Patent [19]
Clayton

[11] 3,776,110
[45] Dec. 4, 1973

[54] DOORLESS PASSBOX FOR X-RAY CASSETTES AND THE LIKE

[76] Inventor: Ralph S. Clayton, 3044 Fillmore Ave., El Paso, Tex. 79930

[22] Filed: Jan. 21, 1972

[21] Appl. No.: 219,735

[52] U.S. Cl. .............................. 95/1, 95/13, 95/90
[51] Int. Cl. ............................................ G03d 17/00
[58] Field of Search ...................... 95/13, 14, 94, 1, 95/90; 34/242; 355/27; 52/204

[56] References Cited
UNITED STATES PATENTS
| | | | |
|---|---|---|---|
| 3,120,795 | 2/1964 | Land | 95/90 |
| 3,435,751 | 4/1969 | Goodman | 95/94 |
| 2,114,638 | 4/1938 | Parker | 95/67 |

Primary Examiner—John M. Horan
Attorney—Roberts B. Larson et al.

[57] ABSTRACT

A passbox between light and dark rooms for X-ray cassettes or the like. A plurality of slots are provided in the common wall between the light and dark rooms, each slot of sufficient dimensions for an X-ray cassette or the like to be passed completely through the slot from the light room to the dark room. A suitable material including tough resilient fibers extends from one or both walls of each slot across the slot in sufficient volume to form a light seal. The fibers are sufficiently stiff to form the light seal in the absence of an object located in the slot and yet smooth, strong and flexible enough to be pushed aside to permit an object such as an X-ray cassette or the like to pass through the slot and then to return to its original light tight position.

11 Claims, 8 Drawing Figures

PATENTED DEC 4 1973 3,776,110

DOORLESS PASSBOX FOR X-RAY CASSETTES AND THE LIKE

BACKGROUND OF THE INVENTION

This invention relates to the handling of cassettes containing photographic materials, and in particular it relates to a passbox for passing a cassette containing photographic materials sich as X-ray film nd the like between adjacent light and dark rooms. X-ray film is enclosed in a container called a cassette, to prevent film from being exposed by light, but X-rays pass through the cassette and expose the film.

In certain environments such as in the radiology department of a hospital or in the office of the radiologist, the physical facilities must include a room in which the X-rays are taken, commonly referred to as the light room, and an adjacent dark room in which the X-rays are developed. A means is then provided for passing the X-ray cassettes from the light room to the dark room and vice versa without allowing the light from the light room to pass to the dark room.

A conventional X-ray cassette passbox used for this purpose is a rather complicated arrangement comprising two large passageways, one for passing cassettes containing exposed X-ray film from the light room to the dark room, and the other for passing cassettes containing unexposed X-ray film from the dark room back to the light room. A door is provided at each end of each passage, i.e. a total of four doors. To prevent light from accidentally passing from the light room to the dark room, the arrangement includes a complicated interlock which interlocks the four doors such that only one door of the four can be opened at any given time.

This arrangement suffers several disadvantages. Firstly, it is quite complex. Secondly, it may be quite inconvenient and inflexible in use. For example, if the technician in the dark room opened either of the two doors to receive exposed cassettes or insert an unexposed cassette in the appropriate passage or if he forgot to close the door, the technologist in the light room could not open the appropriate door at that end to obtain an unexposed cassette from one passageway or to insert an unexposed cassette in the other passageway.

Other arrangements in X-ray cassette passboxes are known, but all of these have in common the disadvantage of rather complex arrangements for preventing the accidental passage of light from the light room to the dark room.

Thus, there exists a need for a new and improved simplified passbox for X-ray cassettes and the like which is both simplified and which overcomes the disadvantages of existing passboxes.

SUMMARY OF THE INVENTION

Thus, it is a purpose of the present invention to provide a new and improved passbox between a light room and a dark room for X-ray cassettes or the like.

This purpose of the present invention is achieved by providing, in lieu of the complicated arrangement known heretofore, a simple slot or a plurality of slots open and completely through the common wall between the light room and the dark room, the slot or each of the plurality of slots having formed therein fibers arranged to extend across the slot opening to form a light seal. The fibers, which may be natural or plastic fibers, etc., would be sufficiently stiff to form a light seal between the light and dark rooms in their relaxed condition, i.e. in the absence of an object such as an X-ray cassette or the like located in the slot. Concurrently, the fibers would be sufficiently smooth and flexible for an object such as an X-ray cassette or the like to push the fibers aside to be passed through the slot while still maintaining the light tight seal therein, after which the fibers would return to their relaxed state to form a light seal. Heretofore, light seals used in photographic holders have used natural material such as wool plush. However, since resilience and smoothness are preferred in the present invention, long individual synthetic fibers would be preferred. An example would be teflon or teflon coated fibers since they would provide the necessary smoothness.

In a preferred arrangement, a plurality, for example ten or twenty slots can be arranged adjacent each other, arranged either horizontally or vertically in the common wall dividing the light and dark rooms. The thickness of the slot, that is the distance from the entrance opening in one room to the exit opening in the next room would be less than the dimension of the X-ray cassette in that direction. However, it would be great enough to assure that there were sufficient fibers therein to provide a light tight seal at all times.

The above described arrangement will not only vastly simplify the passbox structure, but it will also permit a far more convenient simplified mode of operation. The structure is vastly simplified because the complicated arrangement of interlocked doors or the like is completely eliminated. The arrangement is far more simple and convient to operate since there is no unnecessary waiting while doors are locked. The radiologist or technician in the light room, after exposing a film would simply place it into a slot such that it projects out into the dark room. The technician in the dark room would simply pull out the exposed cassette to develop the same. At the same time, several slots could be allocated and labeled strictly for unexposed cassettes. For example, one slot can be allocated and labeled for a cassette of each size. The technician in the dark room, after preparing an unexposed X-ray cassette would simply place it into the appropriate slot such that it projects out into the light room, and the light room technician or radiologist could simply reach for the appropriate cassette as he required it. Meanwhile, the technician in the dark room, seeing that an unexposed cassette has been pulled out (since it will no longer project out into the dark room) will replace the same. This is in contrast to the previously described arrangement in which cassettes of all different sizes were placed up against each other in the passageway allocated to unexposed cassettes and the dark room technician really had no way of knowing which cassette was pulled out for use in the light room except by occasionally opening the door to that passage and examining the pile of unexposed cassettes therein.

Thus, it is a purpose of the present invention to provide a new and improved passbox for passage of X-ray cassettes or the like between light and dark rooms.

It is another object of this invention to provide a new and improved passbox of the type described which is far more simplified than known passboxes.

It is another object of this invention to provide a new and improved passbox of the type described which is more simple and convenient to operate than previously known passboxes.

It is another object of this invention to provide a new and improved passbox of the type described in which doors and other complicated structures are eliminated and are replaced by a simple slot or a plurality of slots located in the common wall between the light and dark rooms, each slot including a light sealing fiber material therein which forms a light seal both in the absence and the presence of an object such as an X-ray cassette located in the slot.

Other objects and the advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings.

DETAILED DESCRIPTION OF THE PREFERRED EMBODIMENTS

Referring now to the figures, like elements are represented by like numerals throughout the several views.

Figure 1:
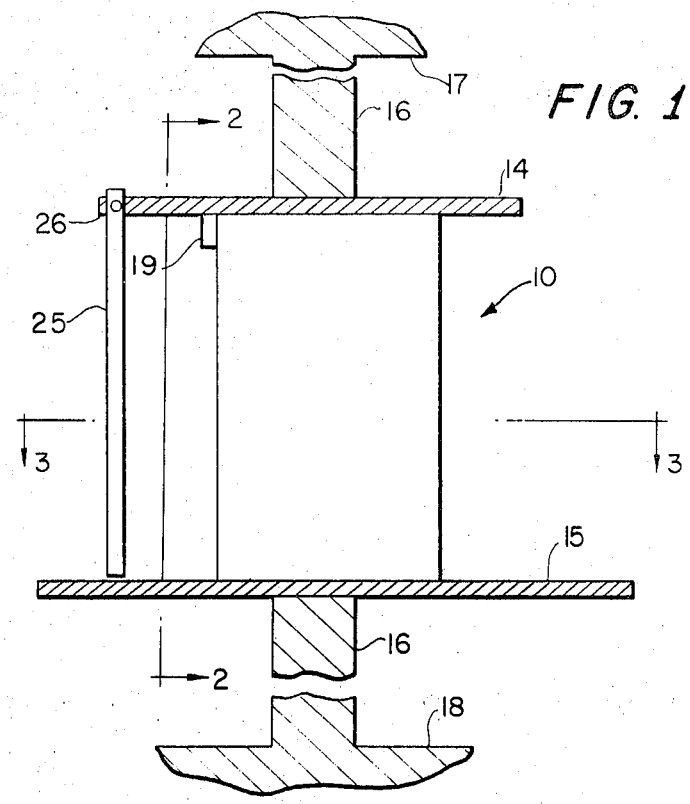
FIG. 1 is a side elevational view of a passbox constructed in accordance with the present invention.
Figure 3:
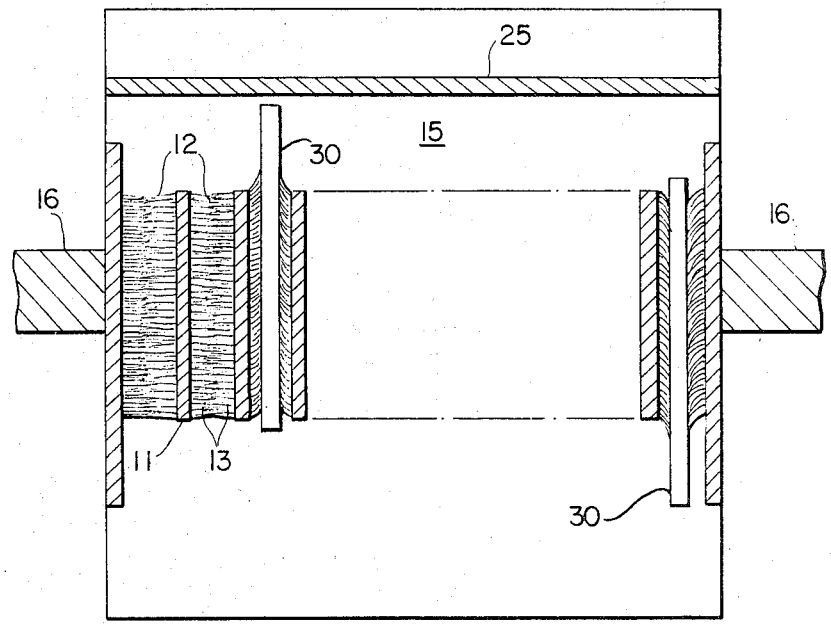
FIG. 3 is a horizontal sectional view taken along line 3—3 of FIG. 1.

Referring to FIGS. 1 through 5, and in particular to FIG. 1, there is shown a typical environment in which an X-ray cassette would be used including a light room and a dark room divided by a common wall 16. A cutout in this wall approximately 18 inches in height and 20 inches across has located therein an X-ray passbox 10. The passbox 10 includes a plurality of vertical divider panels 11 forming between them slots 12. A top plate 14 is provided above the slots and a bottom ledge 15 is provided beneath the slots. In the illustrated embodiment, the slots are approximately 18 inches in length or height, one inch in width, that is across the slots and 6 inchs in depth, that is in the direction perpendicular to the plane of wall 16. With slots constructed in this manner, it would be contemplated to use cassettes which are three-quarters of an inch in thickness and which vary in size including 8 inches × 10 inches, 12 inches × 10 inches, 11 inches × 14 inches and 14 inches × 17 inches. Since both dimensions of the cassettes are greater than 6 inches, it follows that any cassette which is passed through a slot will always project out one side or the other or both sides of the slot. Two such cassettes 30 are shown in FIG. 3.

The ledge 15 is constructed to extend from the passbox into the two rooms 15 a sufficient distance to support any X-ray cassettes located in the slots and projecting out to one side or the other. If the side of the passbox facing the light room is not shielded from an X-ray source, a suitable X-ray curtain such as element 25 may be suitably placed in front of the passbox of this side thereof, suspended from a pivot connection 26 in the top plate 14.

Figure 2:
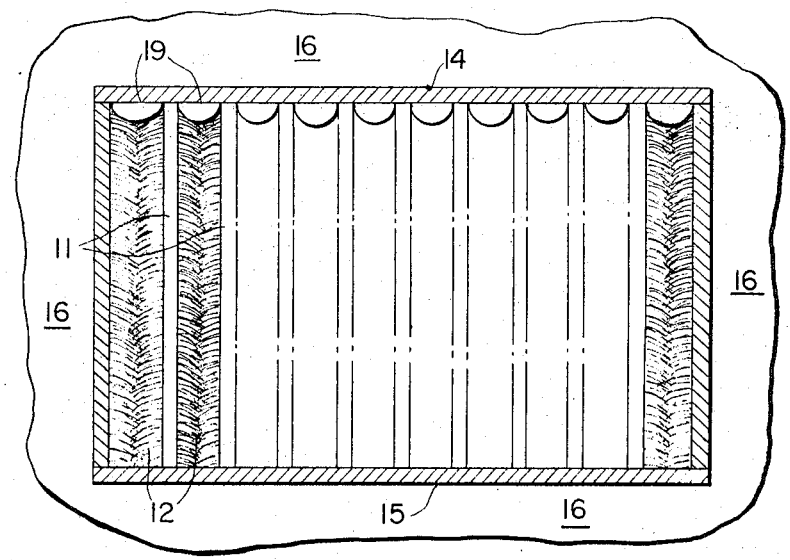
FIG. 2 is a vertical sectional view taken along line 2—2 of FIG. 1.
Figure 4:
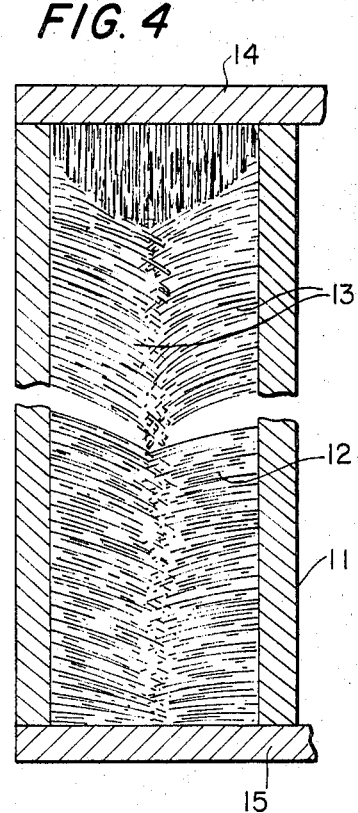
FIG. 4 is an enlarged view of a portion of FIG. 2.

FIG. 4 is an enlarged view of FIG. 2 showing a single slot 12. In each slot there is provided a plurality of fibers 13 extending from both the adjacent surfaces of adjacent side panels 11, these fibers overlapping each other to provide a good light seal in the absence of an object located in the slot. While the fibers must be sufficiently stiff to retain this light tight seal, they must also be sufficiently smooth and flexible to be pushed aside from either side thereof. Such fibers may take the form of a plastic fuzz, i.e. a plurality of plastic fibers or perhaps Teflon fibers. In any event, as these fibers project out from the divider panels 11 into the slots, they may also turn downwardly under the force of gravity as shown in FIG. 4. To prevent light from passing through a small passage at the top of the slot, there may be provided a suitable front top cover plate 19 as shown in FIGS. 1 and 2 or fuzz extending down from top surface of slot.

Figure 5:
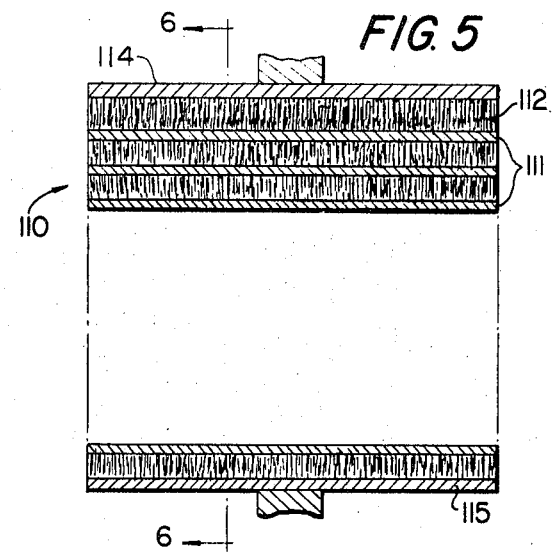
FIG. 5 is a vertical sectional view similar to FIG. 2 but showing another embodiment of the invention.

FIGS. 5 and 6 show another embodiment of the invention. In this embodiment, like numerals represent like elements as the embodiments of FIGS. 1 through 5 except that in this embodiment, the numerals have been increased by 100. The main difference in the embodiments of FIGS. 5 and 6 is that the slots are arranged horizontally rather than vertically. The passbox 110 includes a top plate 114 and a bottom plate or ledge 115. However, in this case since the cassettes do not rest on ledge 15, it need not project out beyond the edges of the slots themselves. However, if the side of the passbox 110 facing the light room is exposed to an X-ray source, it would still be desirable to project the top plate 114 out into this room and to attach a suitable X-ray shield 25 to the end of plate 114.

Passbox 110 includes a plurality of divider panels 111 forming slots 112. The dimensions of these slots are the same as in the embodiment of FIGS. 1 through 5 except, of course, turned 90°.

The embodiment of FIG. 5 may include precisely the same arrangement of fibers 13 as shown in FIG. 4, that it with fibers extending upwardly and downwardly from each surface of each divider panel 111 forming a given slot. However, the horizontal arrangement of the slots 112 in FIG. 5 provides an opportunity to construct the fibers 113 somewhat differently as shown in FIGS. 6A through 6C as fibers 113A, 113B, and 113C.

Figure 6A:
FIG. 6A, 6B, and 6C are vertical sectional views of a single slot taken along line 6—6 of FIG. 5, each view enlarged and each showing a different fiber construction which can be used in the embodiment of FIG. 5.
Figure 6B:
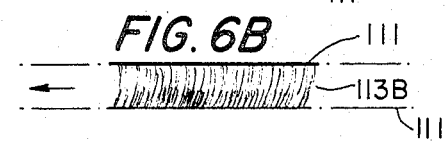
Figure 6C:

In all of FIGS. 6A–6C, the fibers are shown as being attached to only the top divider panel 111, the fibers extending down to the bottom divider panel 111 of each slot. In one arrangement, the fibers may be of a length greater than the width of the slot. In this case, they would be bent in the direction of travel of the cassette through the slot. For example, when using such fibers, one would use fibers 113A oriented as shown in FIG. 6A for those slots used for passing cassettes from the light room to the dark room and fibers 113B oriented as shown in FIG. 6B for the transmission of cassettes or the like from the dark room to the light room. Alternatively, all fibers can be constructed such that they just reach the bottom divider panel 111 as shown at 113C in FIG. 6C. In this case, of course the same construction would be used for all slots regardless of the intended direction of travel of the cassettes therethrough.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A structure including a passbox for handling X-ray cassettes or the like comprising, in combination:

a light room, a photographic dark room, and a common wall dividing the light room and the dark room, and an arrangement for passing X-ray cassette plates or the like through the common wall between the two rooms while always preventing the light of the light room from entering the dark room, said arrangement comprising a plurality of slots formed in the common wall and passing completely therethrough, each said slot formed by a pair of generally parallel divider panels having facing surfaces extending generally perpendicular to the common wall to define said slot, the length of the slot, which is the dimension taken in a plane parallel to the panel surfaces and perpendicular to the wall being three to nine inches, and the width of the slot which is the perpendicular distance between the said panel surfaces being at least three-fourths inch, a plurality of elongated fibers fixed to at least one of said panels and extending across the width of the slot to completly close the slot to form a light tight trap preventing light from passing from the light room to the dark room, said fibers being sufficiently stiff to maintain their position across the slot to preserve the said light tightness of the slot in the absence of an object located in the slot, and said fibers being sufficiently resilient to move aside to permit an object such as an X-ray cassette or the like to pass through the slot while still maintaining the slot in a light tight condition, the bottom surface of each slot including a horizontal portion fixed with respect to the common wall and extending in the direction perpendicular to the common wall a sufficient distance to provide a surface on which an X-ray cassette or the like can rest as it is located in the slot.

2. A passbox according to claim 1, said plurality of said slots arranged adjacent each other in said common wall.

3. A passbox according to claim 2, wherein said plurality of slots are arranged side by side with their lengths extending vertically, and wherein in each slot the fibers extend out from both panels towards the other panel, the two sets of fibers overlapping in the center of the slot.

4. A passbox according to claim 3, and said horizontal portion is a horizontal ledge immediately beneath all of the slots extending from the two ends of the slots out into the light room and into the dark room, respectively, to provide said surface on which the X-ray cassettes or the like can rest as they are located in the slots.

5. A passbox according to claim 2, wherein said plurality of slots are arranged one above the other with their said lengths extending horizontally.

6. A passbox according to claim 5, wherein in each slot the fibers are connected only to the upper panel of each slot and extend downwardly into engagement with the lower panel surface of that slot.

7. A passbox according to claim 6, said fibers being relatively soft such that they are of sufficient thickness to extend downwardly across the slots with the assistance of gravity.

8. A passbox according to claim 2, including an X-ray shield curtain shielding the light side of the slots from X-rays in the light room.

9. A passbox according to claim 2, each slot being about 18 inches in length and one inch in width.

10. A passbox for X-ray cassettes or the like comprising in combination:

a light room, a photographic dark room, and a common wall dividing the light room and the dark room, and an arrangement for passing X-ray cassette plates or the like through the common wall between the two rooms while always preventing the light of the light room from entering the dark room, said arrangement comprising a plurality of adjacent slots formed in the common wall and passing completely therethrough, each slot formed by a pair of generally parallel divider panels having facing surfaces extending generally perpendicular to the common wall to define said slot, the length of the slot which is the dimension taken in a plane parallel to the panel surfaces and perpendicular to the wall and the width of the slot which is the perpendicular distance between the said panel surfaces being sufficiently large for an X-ray cassette or the like to pass therethrough, a plurality of elongated fibers fixed to at least one of said panels and extending across the width of the slot to form a light tight trap preventing light from passing from the light room to the dark room, said fibers being sufficiently stiff to maintain their position across the slot to preserve the light tightness of the slot in the absence of an object located in the slot, and said fibers being sufficiently resilient to move aside to permit an object such as an X-ray cassette or the like to pass through the slot while still maintaining the slot in a light tight condition, said plurality of slots being arranged side by side with their lengths extending vertically, and wherein in each slot the fibers extend out from both panels towards the other panel, the two sets of fibers overlapping in the center of the slot, and wherein the slots are approximately three to nine inches taken in the direction perpendicular to the common wall, and including a horizontal ledge immediately beneath all of the slots extending from the two ends of the slots out into the light room and into the dark room, respectively, to provide a surface on which the X-ray cassettes or the like can rest as they are located in the slots.

11. A passbox for X-ray cassettes or the like comprising, in combination:

a light room, a photographic dark room, and a common wall dividing the light room and the dark room, and an arrangement for passing X-ray cassette plates or the like through the common wall between the two rooms while always preventing the light of the light room from entering the dark room, said arrangement comprising a plurality of adjacent slots formed in the common wall and passing completely therethrough, each slot formed by a pair of generally parallel divider panels having facing surfaces extending generally perpendicular to the common wall to define said slot, the length of the slot which is the dimension taken in a plane parallel to the panel surfaces and perpendicular to the wall and the width of the slot which is the perpendicular distance between the said panel surfaces being sufficiently large for an X-ray cassette or the like to pass therethrough, a plurality of elongated fibers fixed to at least one of said panels and extending across the width of the slot to form a light tight trap preventing light from passing from the light room to the dark room, said fibers being sufficiently stiff to maintain their position across the slot to preserve the light tightness of the slot in the absence of an object located in the slot, said fibers being sufficiently resilient to move aside to permit an object such as an X-ray cassette or the like to pass through the slot while still maintaining the slot in a light tight condition, and including an X-ray shield curtain shielding the light side of the slots from X-rays in the light room.

* * * * *